(12) United States Patent
Uh

(10) Patent No.: US 7,960,055 B2
(45) Date of Patent: Jun. 14, 2011

(54) SECONDARY BATTERY

(75) Inventor: Hwail Uh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1202 days.

(21) Appl. No.: 11/648,451

(22) Filed: Dec. 28, 2006

(65) Prior Publication Data

US 2007/0154802 A1 Jul. 5, 2007

(30) Foreign Application Priority Data

Dec. 29, 2005 (KR) .................. 10-2005-0134524

(51) Int. Cl.
  *H01M 2/06* (2006.01)
  *H01M 2/08* (2006.01)
  *H01M 2/00* (2006.01)
(52) U.S. Cl. ........ 429/180; 429/174; 429/163; 429/178; 429/179; 29/623.1
(58) Field of Classification Search .................. None
  See application file for complete search history.

(56) References Cited

U.S. PATENT DOCUMENTS

2006/0099490 A1* 5/2006 Cho et al. .................. 429/53
2006/0141355 A1* 6/2006 Kang .................. 429/182

* cited by examiner

*Primary Examiner* — Dah-Wei Yuan
*Assistant Examiner* — Angela J. Martin
(74) *Attorney, Agent, or Firm* — Christie, Parker & Hale, LLP

(57) ABSTRACT

A secondary battery including an electrode assembly having a first electrode, a second electrode, and a separator interposed between the first electrode and the second electrode and a can housing the electrode assembly, the can having an opening on one end. The secondary battery further includes a cap assembly having a cap plate having a terminal hole, the cap plate coupled to the opening of the can, an electrode terminal inserted through the terminal hole, and a terminal plate coupled with an interior end of the electrode terminal. The terminal plate has a placement recess located on an interior-facing surface, the placement recess preventing the interior end of the electrode terminal from protruding past the interior-facing surface of the terminal plate.

16 Claims, 4 Drawing Sheets

SECONDARY BATTERY

CROSS-REFERENCE TO RELATED APPLICATION

This application claims priority to and the benefit of Korean Patent Application No. 10-2005-0134524 filed in the Korean Intellectual Property Office on Dec. 29, 2005, the entire content of which is incorporated herein by reference.

BACKGROUND OF THE INVENTION

1. Field of the Invention

The present invention relates to a secondary battery, and more particularly to a secondary battery having a structure allowing an electrode tap to be welded to an interior end of an electrode terminal and/or an interior-facing surface of a terminal plate.

2. Description of the Related Art

As is well-known in the art, a secondary battery is a rechargeable battery whereas a primary battery is not rechargeable. Secondary batteries are used in the field of high-tech electronic equipment like cellular phones, notebook computers and camcorders. The operating voltage of a lithium secondary battery is 3.6 volts, about three times larger than a nickel-cadmium battery or a nickel-hydrogen battery often used to power electronic equipment. Thus, lithium secondary batteries have become widely used because of their high energy density per unit weight.

Conventional lithium secondary batteries use lithium oxides as an active positive polarity substance and use carbon materials as an active negative polarity substance. Lithium secondary batteries are manufactured in various shapes such as a cylindrical shape, a cone shape, a pouch shape, and others.

A conventional secondary battery usually includes a can, an electrode assembly housed in the can and a cap assembly coupled with the can. The cap assembly includes a cap plate coupled with the upper part of the can, an electrode terminal installed through a terminal hole and having a gasket for insulation from the cap plate, an insulating plate installed on an interior surface of the cap plate, and a terminal plate installed on an interior-facing surface of the insulating plate to contact the electrode terminal. One electrode of the electrode assembly is electrically connected to the electrode terminal through an electrode tap and the terminal plate, and the other electrode is electrically connected to the cap plate or the can through an electrode tap connected thereto.

To assemble the cap assembly, the electrode terminal is rotated and inserted into a terminal hole on the cap plate and holes on the insulating plate and the terminal plate. The end of the electrode terminal inserted into the terminal plate is compressed.

However, the conventional cap assembly has certain drawbacks. The interior end of the electrode terminal, which is inserted and compressed in the hole formed on the terminal plate, protrudes further into the secondary battery than the neighboring interior surface of the terminal plate, thus making it difficult to weld or attach the electrode tap on the interior end of the electrode terminal directly.

As such, it is necessary to extend one side of the terminal plate to weld it to the electrode tap. It is not possible to extend both sides of the terminal plate since the electrode taps must have opposite polarities. As a result, a terminal plate and an insulating plate that are asymmetrical about the electrode terminal are used.

Accordingly, when the electrode terminal is rotated and inserted, the structure when the structure fixing the insulating plate may also rotate since its resistance against rotation is weak. Therefore, a short circuit may occur between the cap plate and the terminal plate.

Also, since the electrode tap is not directly welded to the interior end of the electrode terminal but rather is welded to one side of the terminal plate, the path through which the current produced from the battery portion flows is longer and the electric resistance increases.

SUMMARY OF THE INVENTION

A secondary battery is provided including an electrode assembly having a first electrode, a second electrode, and a separator interposed between the first electrode and the second electrode and a can housing the electrode assembly, the can having an opening on one end. The secondary battery also includes a cap assembly having a cap plate having a terminal hole, the cap plate coupled to the opening of the can, an electrode terminal inserted through the terminal hole, and a terminal plate coupled with an interior end of the electrode terminal. The terminal plate has a placement recess located on an interior-facing surface, the placement recess preventing the interior end of the electrode terminal from protruding past the interior-facing surface of the terminal plate. In an alternate embodiment, the interior end of the electrode terminal and the interior-facing surface of the terminal plate are flush. The secondary battery may further include an electrode tap protruding from one of the first electrode and the second electrode, wherein the electrode tap is in direct contact with the interior end of the electrode terminal and or wherein the electrode tap is in direct contact with the interior surface of the terminal plate.

A distance between the interior end of the electrode terminal and a base surface of the can may be greater than a distance between the interior-facing surface of the terminal plate and the base surface of the can. Additionally, the terminal plate and an insulating plate between the cap plate and the terminal plate may be symmetrical about the electrode terminal.

The secondary battery may further include a cap plate coupling portion located on an interior-facing surface of the cap plate coupled to an insulating plate coupling portion located on an exterior-facing surface of the insulating plate. The cap plate coupling portion may be a protrusion, and the insulating plate coupling portion may be a groove corresponding to the cap plate coupling portion.

The interior-facing surface of the insulating plate may have a recess adapted to receive at least a part of the terminal plate and the interior-facing surface of the cap plate may have a recess adapted to receive at least a part of the insulating plate.

In another exemplary embodiment of the present invention, a method of directly connecting an electrode tap of an electrode to an electrode terminal of a secondary battery as described above includes locating a placement recess on an interior-facing surface of the terminal plate and inserting the electrode terminal through a hole in the terminal plate to couple an interior end of the electrode terminal with the placement recess, wherein the interior end of the electrode terminal is recessed or flush with respect to the interior-facing surface of the terminal plate.

DETAILED DESCRIPTION

Figure 1:
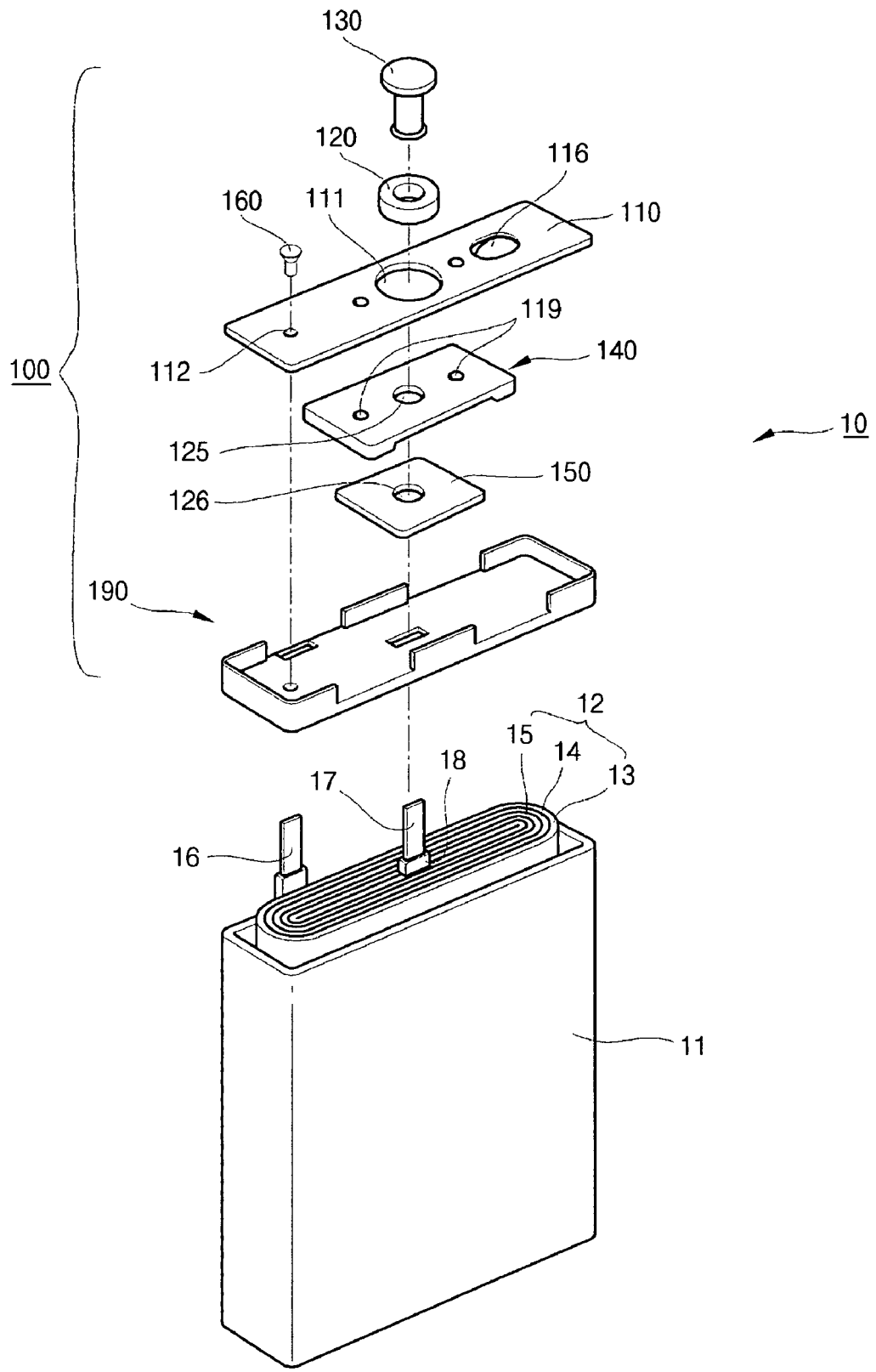
FIG. 1 is an exploded perspective view illustrating a secondary battery according to an exemplary embodiment of the present invention.

Referring to FIG. 1, the secondary battery 10 includes an electrode assembly 12, a can 11 housing the electrode assembly 12 and a cap assembly 100 coupled with the can 11.

The electrode assembly 12 includes a positive electrode 13 and a negative electrode 15 in the shape of a broad plate to increase electrical capacity, a separator 14 located between the positive electrode 13 and the negative electrode 15, the separator 14 insulating the positive electrode 13 from the negative electrode 15. The electrode assembly may have a jelly-roll configuration.

The negative electrode 15 and the positive electrode 13 may be assembled by coating carbon, an active negative polarity substance, and lithium cobalt oxide, an active positive polarity substance, on collectors constituting copper and aluminum foil, respectively. The separator 14 may be polyethylene, polypropylene, or a copolymer of polyethylene and polypropylene. In one exemplary embodiment, the separator may be wider than the positive electrode 13 and the negative electrode 15 to prevent a short circuit. Positive and negative polarity taps 16, 17 connected to each electrode protrude from the electrode assembly 12. Insulating tape 18 is wound around the boundary portion of the positive and negative polarity taps 16, 17 protruding from the electrode assembly 12 to prevent a short circuit between the polarity plates 13, 15 and taps 16, 17, respectively.

The can 11 may be a container made of a metal having an approximately rectangular shape, and may be formed by, for example, a deep drawing process. The can 11 itself may act as a terminal. In one exemplary embodiment, the can may be made of aluminum (Al) or an aluminum alloy which is a lightweight conductive metal. The can 11 houses the electrode assembly 12 and electrolyte. One end of the can is sealed by a cap assembly 100 and allows electrolyte to be injected therein.

The cap assembly 100 comprises a cap plate 110, an electrode terminal 130, an insulating plate 140 and a terminal plate 150. A terminal hole 111 is formed on the cap plate 110. The electrode terminal 130 is insertable into the terminal hole 111 and a gasket 120 is located around the circumference of the electrode terminal to insulate the electrode terminal from the cap plate 110.

The insulating plate 140 is installed on an interior-facing surface of the cap plate 110 and the terminal plate 150 is installed on an interior-facing surface of the insulating plate 140. An interior end 132 of the electrode terminal 130 is coupled with the terminal plate 150 by rotating and inserting the electrode terminal 130 through the terminal hole 111 and through holes 125, 126 formed respectively on the insulating plate 140 and the terminal plate 150, and compressing the interior end of the electrode terminal 130 into the terminal plate 150. As noted above, if the insulating plate 140 and the terminal plate 150 are rotated together during rotating of the electrode terminal 130, a short circuit may occur between the cap plate 110 and the terminal plate 150. The structure for preventing a short circuit will be described below.

The negative electrode 15 of the electrode assembly 12 may be electrically connected to the electrode terminal 130 through the negative polarity tap 17 and the terminal plate 150. Additionally, the negative electrode 15 may be directly electrically connected to the electrode terminal 130 through the negative polarity tap 17, as described in more detail below. The positive polarity tap 16 is welded to the cap plate 110 or the can 11 to electrically connect the positive electrode 16 to cap plate or can. A second insulating plate 190 may also be installed on an interior surface of the terminal plate 150.

A vent 116 is formed on the cap plate 110 to provide security against explosion of the battery. The vent 116 allows the discharge of internal gas when the internal pressure of the battery increases to a certain point due to overcharging by being thinner than the rest of the cap plate 110.

An electrolyte injection hole 112 to allow electrolyte to be injected into the inside of the can 11 is formed on the cap plate 110, and a plug 160 may be used to seal the electrolyte injection hole 112 after electrolyte has been injected. Various types of plugs may be used. For example, the electrolyte injection hole 112 may be sealed by placing a ball having a larger diameter than the electrolyte injection hole 112 on the electrolyte injection hole, mechanically compressing the ball to the electrolyte injection hole, and welding the edges of the plug 160 to the cap plate. Also, the electrolyte injection hole 112 may be sealed by using a sealing plate to cover the electrolyte injection hole 112 and welding the edges of the sealing plate to the cap plate.

Figure 2A:
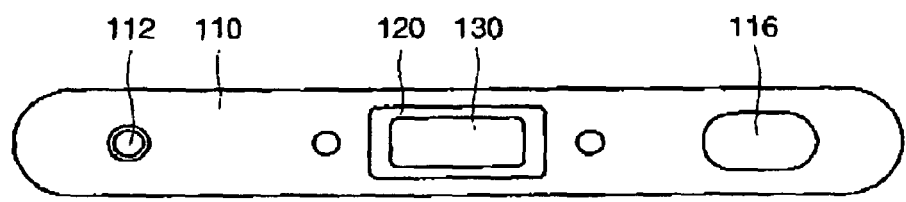
FIGS. 2A, 2B and 2C, are, respectively, a top plan view, a sectional view and a bottom plan view of the cap assembly of the secondary battery illustrated in FIG. 1.
Figure 2B:
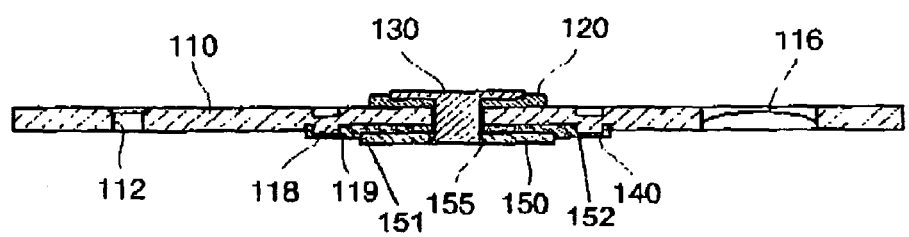
Figure 2C:
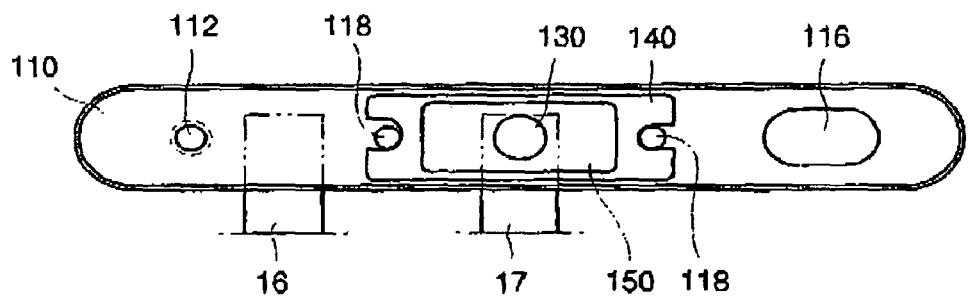
Figure 3:
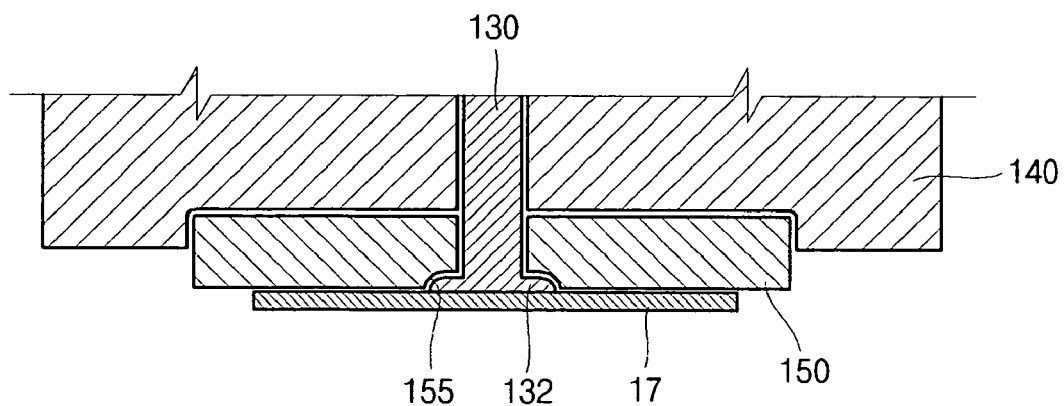
FIG. 3 is a partial detailed view of the cap assembly illustrated in FIG. 2B.

FIGS. 2A, 2B and 2C are a top plan view, a sectional view and a bottom plan view, respectively, of the cap assembly of the secondary battery illustrated in FIG. 1. FIG. 3 is a partial detailed sectional view of the cap assembly illustrated in FIG. 2B.

With reference to FIGS. 2A, 2B, 2C and 3, the cap assembly 100 includes a cap plate 110 on which a terminal hole 111 (FIG. 1) is formed, an electrode terminal 130 inserted through the terminal hole having a gasket 120 located around a circumference of the electrode terminal to insulate the electrode terminal from the cap plate 110, a terminal plate 150 coupled with an interior end of the electrode terminal 130, and an insulating plate 140 disposed between the cap plate 110 and the terminal plate 150 to insulate the cap plate 110 from the terminal plate 150. A placement recess 155, in which the interior end 132 of the electrode terminal may be housed, is formed on an interior-facing surface of the terminal plate 150.

As described above, when the cap assembly 100 is assembled, the electrode terminal 130 is rotated and inserted through the terminal hole 111 of the cap plate 110 and into holes 125, 126 formed respectively on the insulating plate 140 and the terminal plate 150. The interior end 132 of the electrode terminal 130 is compressed into the placement recess 155. Accordingly, the interior end 132 of the electrode terminal and the lower surface of the terminal plate 150 may be located on the same plane (i.e., they are flush) and the interior end 132 does not protrude past the plane of the interior-facing surface of the terminal plate.

In this configuration, the electrode tap (a negative polarity tap 17 in FIG. 2C) protruding from one electrode may be assembled in direct contact with the interior end 132 of the electrode terminal 130 as shown in FIG. 3. Additionally, since the negative polarity tap 17 may be in direct contact with the interior end 132 of the electrode terminal it is not necessary to extend one side of the terminal plate 150 to weld the terminal plate to the negative polarity tap 17. Therefore, the terminal plate 150 may be symmetrically formed about the electrode terminal 130. Further, the insulating plate 140 insulates the cap plate 110 from the terminal plate 150 and must be extended in a conventional secondary battery to be welded to the negative polarity tap. However, embodiments of the present invention allow for the insulating plate 140 to be symmetrically formed about the electrode terminal 130.

The cap plate may include protrusions 118 protruding from the interior-facing surface of the cap plate 110. Grooves 119 corresponding to the protrusions 118, and into which the protrusions may be inserted, are formed on an exterior-facing surface of the insulating plate 140. When the protrusions 118 are inserted into the grooves 119, relative rotation between the cap plate 110 and the insulation plate 140 is eliminated and a short circuit between the cap plate and the terminal plate may be prevented.

In one exemplary embodiment, the interior-facing surface of the insulating plate 140 is formed to be recessed so that a part or all of the terminal plate 150 is receivable in the recess 151. This configuration not only prevents the terminal plate 150 from rotating with the electrode terminal 130, but also allows the overall size of the battery to be reduced and the battery capacity to be increased. Additionally, the interior-facing surface of the cap plate 110 may be formed to have a recess 152 to receive a part or all of the insulating plate 140 for the reasons described above.

Figure 4:
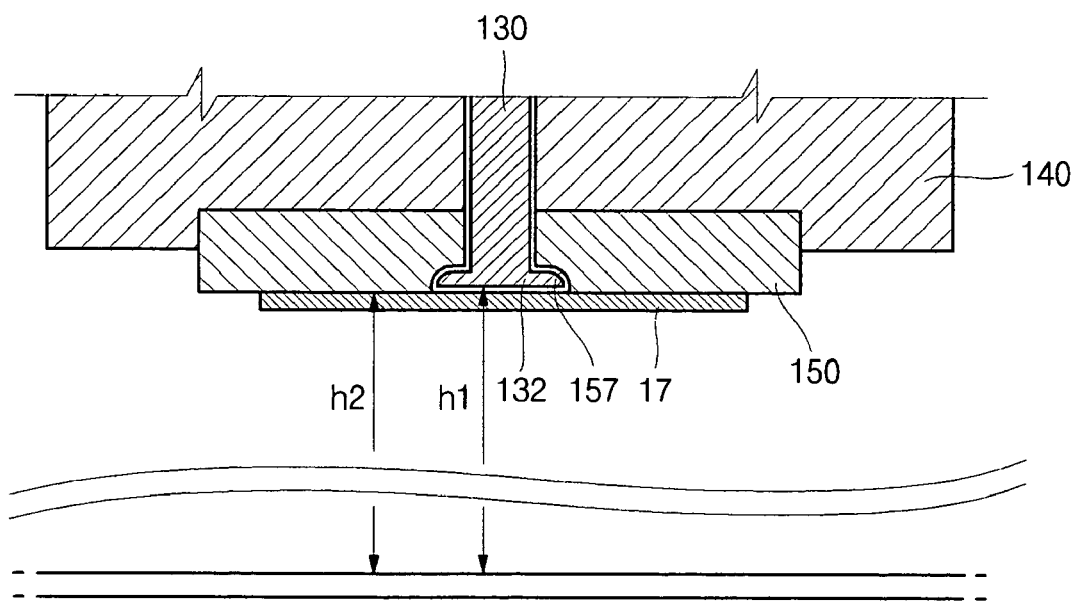
FIG. 4 is a partial detailed view of a sectional view of a cap assembly of a secondary battery according to another exemplary embodiment of the present invention.

FIG. 4 is a partial detailed sectional view of the secondary battery according to another exemplary embodiment of the present invention. A placement recess 157 is formed on the interior-facing surface of the terminal plate 150 in which the interior end 132 of the electrode terminal is locatable. Accordingly, the distance (h1) between the interior end 132 of the electrode terminal 130 and the bottom of the can 11 may be greater than the distance (h2) between the interior-facing surface of the terminal plate 150 and the bottom of the can 11.

In this configuration, the electrode tap 17 may be in contact with the interior-facing surface of the terminal plate rather than being in direct contact with the interior end 132 of the electrode terminal 130 since the placement recess is deeper than the thickness of the interior end. However, a symmetrical terminal plate and insulating plate may still be used.

Figure 5:
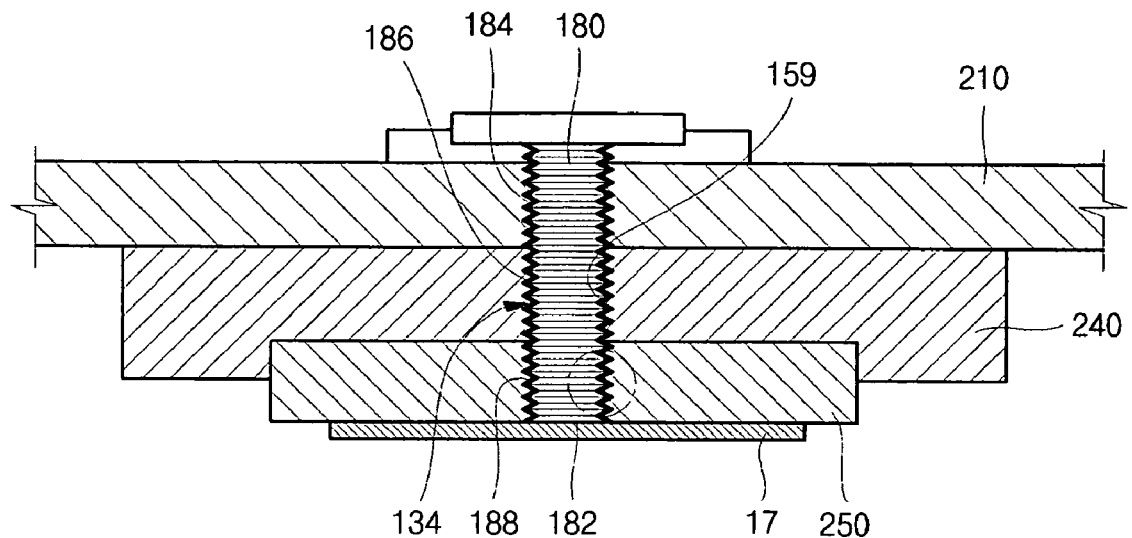
FIG. 5 is a partial detailed sectional view according to yet another exemplary embodiment of the present invention.
Figure 6:
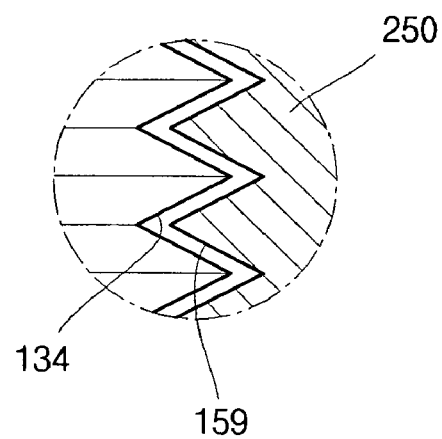
FIG. 6 is a detailed view of a threaded region of the electrode terminal illustrated in FIG. 5.

The present invention is not restricted by the formation of a placement recess on the interior surface of the terminal plate 150. For example, another exemplary embodiment of the present invention illustrated in FIGS. 5 and 6 may include threads 159 on the side walls of the holes 184, 186, 188 formed respectively on a cap plate 210, an insulating plate 240 and a terminal plate 250. The threads 159 are adapted to receive an electrode terminal 180 formed as a screw with threads 134. When the electrode terminal 180 is threaded through holes 184, 186, 188, the electrode terminal may be adjusted so that an interior end 182 of the electrode terminal 180 is flush with an interior-facing surface of the terminal plate 250.

An adhesive may also be used to secure an electrode terminal and keep an interior end of the electrode terminal flush with an interior facing surface of a terminal plate.

The exemplary embodiments of the present invention allow an electrode tap to be easily welded directly to a terminal plate due to a placement recess allowing a interior end of an electrode terminal to be flush with the terminal plate. Thus, electrical resistance may be minimized. Additionally, no separate space for welding the electrode tap on one side of the terminal plate is necessary, allowing for a symmetrical terminal plate and insulating plate. As such, when the electrode terminal is rotated and inserted through the terminal plate and insulating plate, the insulating plate is prevented from being rotated and a short circuit between the cap plate and the terminal plate may be prevented. Since, the sizes of the terminal plate and the insulating plate are reduced, the cost of producing the battery is reduced and the size of the entire battery is reduced.

It will be understood by those of ordinary skill in the art that various replacements, modifications and changes in form and details may be made herein without departing from the spirit and scope of the present invention as defined by the following claims and that the above-described embodiments are for purposes of illustration only and are not to be construed as limitations of the invention.

What is claimed is:

1. A secondary battery, comprising:
an electrode assembly including a first electrode, a second electrode, and a separator interposed between the first electrode and the second electrode;
a can housing the electrode assembly, the can having an opening on one end; and
a cap assembly including a cap plate having a terminal hole, the cap plate coupled to the opening of the can, an electrode terminal inserted through the terminal hole, and a terminal plate coupled with an interior end of the electrode terminal,
wherein the terminal plate has a placement recess located on an interior-facing surface, the placement recess preventing the interior end of the electrode terminal from protruding past the interior-facing surface of the terminal plate.

2. The secondary battery of claim 1, wherein the interior end of the electrode terminal and the interior-facing surface of the terminal plate are flush.

3. The secondary battery of claim 2, further comprising an electrode tap protruding from one of the first electrode and the second electrode, and
wherein the electrode tap is in direct contact with the interior end of the electrode terminal.

4. The secondary battery of claim 3, wherein the electrode tap is in direct contact with the interior-facing surface of the terminal plate.

5. The secondary battery of claim 1, wherein a distance between the interior end of the electrode terminal and a base surface of the can is greater than a distance between the interior-facing surface of the terminal plate and the base surface of the can.

6. The secondary battery of claim 5, further comprising an electrode tap protruding from one of the first electrode and the second electrode, and
wherein the electrode tap is in direct contact with the interior-facing surface of the terminal plate.

7. The secondary battery of any one of claim 1, wherein the terminal plate is symmetrical about the electrode terminal.

8. The secondary battery of claim 7, wherein an insulating plate is disposed between the cap plate and the terminal plate, the insulating plate being symmetrical about the electrode terminal.

9. The secondary battery of claim 8, wherein a cap plate coupling portion located on an interior-facing surface of the cap plate is coupled to an insulating plate coupling portion located on an exterior-facing surface of the insulating plate.

10. The secondary battery of claim 9, wherein the cap plate coupling portion is a protrusion, and the insulating plate coupling portion is a groove corresponding to the cap plate coupling portion.

11. The secondary battery of claim 8, wherein an interior-facing surface of the insulating plate has a recess adapted to receive at least a part of the terminal plate.

12. The secondary battery of claim 8, wherein an interior-facing surface of the cap plate has a recess adapted to receive at least a part of the insulating plate.

13. A secondary battery, comprising:
- an electrode assembly including a first electrode, a second electrode, and a separator interposed between the first electrode and the second electrode;
- a can housing the electrode assembly, the can having an opening on one end; and
- a cap assembly including a cap plate having a terminal hole, the cap plate coupled to the opening of the can, an electrode terminal inserted through the terminal hole, and a terminal plate coupled with an interior end of the electrode terminal,
- wherein a distance between the interior end of the electrode terminal and a base surface of the can is greater than or equal to a distance between an interior-facing surface of the terminal plate and the base surface of the can.

14. The secondary battery of claim 13,
- further comprising an electrode tap protruding from one of the first electrode and the second electrode, wherein the electrode tap is in direct contact with the interior end of the electrode terminal,
- wherein the distance between the interior end of the electrode terminal and the base surface of the can is substantially equal to the distance between the interior-facing surface of the terminal plate and the base surface of the can.

15. The secondary battery of claim 1, wherein the terminal plate is formed to be symmetrical about the electrode terminal.

16. A method of directly connecting an electrode tap of an electrode to an electrode terminal of a secondary battery, the secondary battery including:
- an electrode assembly having a first electrode, a second electrode, and a separator interposed between the first electrode and the second electrode,
- a can housing the electrode assembly, the can having an opening on one end, and
- a cap assembly including a cap plate having a terminal hole, the cap plate coupled to the opening of the can, and the electrode terminal inserted through the terminal hole, the method comprising:
- locating a placement recess on an interior-facing surface of a terminal plate of the cap assembly; and
- inserting the electrode terminal through a hole in the terminal plate to couple an interior end of the electrode terminal with the placement recess such that the interior end of the electrode terminal is recessed or flush with respect to the interior-facing surface of the terminal plate.

* * * * *

UNITED STATES PATENT AND TRADEMARK OFFICE
CERTIFICATE OF CORRECTION

PATENT NO. : 7,960,055 B2  Page 1 of 1
APPLICATION NO. : 11/648451
DATED : June 14, 2011
INVENTOR(S) : Hwail Uh It is certified that error appears in the above-identified patent and that said Letters Patent is hereby corrected as shown below:

Column 8, Claim 15, line 1    Delete "claim 1" Insert -- claim 14 --

Signed and Sealed this
Fifth Day of June, 2012

David J. Kappos
*Director of the United States Patent and Trademark Office*